United States Patent
Wasiewicz

(10) Patent No.: US 7,199,752 B2
(45) Date of Patent: Apr. 3, 2007

(54) PHASED NULL RADAR

(75) Inventor: Richard Wasiewicz, Tully, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 11/519,292

(22) Filed: Sep. 12, 2006

(65) Prior Publication Data

US 2007/0008214 A1    Jan. 11, 2007

Related U.S. Application Data

(62) Division of application No. 10/648,166, filed on Aug. 25, 2003, now Pat. No. 7,126,526.

(51) Int. Cl.
*G01S 13/00* (2006.01)

(52) U.S. Cl. ............... 342/159; 342/134; 342/135; 342/137; 342/192

(58) Field of Classification Search ............... 342/21, 342/134, 135, 137, 159, 162, 165, 174, 192
See application file for complete search history.

(56) References Cited

U.S. PATENT DOCUMENTS

| | | | |
|---|---|---|---|
| 4,078,234 A | 3/1978 | Fishbein et al. | |
| 4,241,347 A | 12/1980 | Albanese et al. | |
| 4,328,495 A | 5/1982 | Thue | |
| 4,720,712 A * | 1/1988 | Brookner et al. | ........... 342/383 |
| 4,937,584 A | 6/1990 | Gabriel et al. | |
| 5,021,793 A | 6/1991 | Stangel et al. | |
| 5,109,231 A | 4/1992 | Olsson | |
| 5,252,983 A * | 10/1993 | Sezai | ........... 342/382 |
| 5,515,060 A | 5/1996 | Hussain et al. | |
| 5,537,117 A | 7/1996 | Rose | |
| 5,818,517 A | 10/1998 | Hudson et al. | |
| 6,166,689 A | 12/2000 | Dickey et al. | |
| 6,175,327 B1 * | 1/2001 | Lin et al. | ........... 342/357.06 |
| 2002/0130810 A1 | 9/2002 | Gottwald et al. | |
| 2003/0117313 A1 | 6/2003 | Isaji | |

\* cited by examiner

*Primary Examiner*—Thomas H. Tarcza
*Assistant Examiner*—Isam Alsomiri
(74) *Attorney, Agent, or Firm*—Plevy, Howard & Darcy, PC

(57) ABSTRACT

A method for reducing the interference between a source transmitting pulses and equipments having nominal bandwidths which are outside the nominal bandwidth of the transmitted pulses, but which respond to sideband energy of the pulses. Phase perturbations are applied to the edges of the pulses produced by the source, to thereby tend to null the sideband energy lying in the nominal bandwidth of the equipments occupying the adjacent nominal bandwidths.

3 Claims, 5 Drawing Sheets

PHASED NULL RADAR

CROSS-REFERENCE TO RELATED APPLICATIONS

This application is a divisional of U.S. patent application Ser. No. 10/648,166, entitled PHASED NULL RADAR, filed Aug. 25, 2003 now U.S. Pat. No. 7,126,526 which is incorporated by reference herein its entirety.

FIELD OF THE INVENTION

This invention relates to radar, and more particularly to radar that transmits constant-amplitude broadband pulses, and especially to reduction of out-of-sub-band components lying in another sub-band.

BACKGROUND OF THE INVENTION

Radar systems traditionally transmit electromagnetic pulses at a nominal center frequency toward the region in which targets are expected to be found, and detect the presence of the target by receiving reflected pulses during the inter-transmit-pulse interval. It has long been known that these transmitted pulses have an overall bandwidth which is a function of the pulse width, and which can be affected by the rise and fall times of the pulses, as well as the width and shape of the pulse envelope (including amplitude modulation and the shape of the leading and trailing edges), and the pulse's phase (including frequency) modulation. The bandwidth of high-power electromagnetic pulses with rapid rise and fall times is such that significant energy components occur in frequency ranges occupying frequency sub-bands bands away from the nominal center frequency or bandwidth of the radar. In this context, a radar band is considered to be a named radar band such as C-band or X-band, which contains sub-bands, as for example the 3 MHz sub-band 9800 MHz to 9803 MHz within the X band. These energy components may interfere with such equipments occupying other frequency sub-bands away from the bandwidth of the radar. In times past, the interference was usually manifested in non-radar equipment in these other frequency ranges or sub-bands, because of the relatively high power of the radar pulses, although some interference with the radar receiver by other equipments occasionally occurred.

In the sixty or so years since the introduction of radar, many sophisticated schemes have been used to improve the efficacy of radar. One such scheme allows a radar system to detect targets, at the same antenna beam position, at both short and long distances. This is accomplished by the use of constant-amplitude transmitted pulse waveforms divided into two contiguous portions. A first of the two contiguous portions of the transmitted pulse waveform includes a high-energy long-duration subpulse for long-range detection, and the second portion includes a low-energy short-duration subpulse for short-range detection.

Also in the years since radar was introduced, the number of other users of the electromagnetic spectrum has grown, and many of these additional users operate in the same general frequency bands as radar systems. The broad bandwidth and high power of radar pulses still causes interference in equipments operating in nearby frequency bands, but there are now many more such equipments than in the past. To avoid overlapping bandwidths, a buffer or isolation band of frequencies is normally introduced between the frequency band of a radar and the operating frequency band(s) of other equipments lying within a line of sight extending to the radar horizon. When it is desired to install a new radar system, there may now be few, if any, operating frequencies available for a radar system, if interference with existing installations of other equipments is to be avoided. In extreme cases, a radar system may be limited to use only in wartime. Even if operation of a radar in peacetime is allowed, the paucity of available operating bandwidth and its effect on frequency diversity may compromise system performance.

Reduced radar system interference is desired.

SUMMARY OF THE INVENTION

A method according to an aspect of the invention is for reducing the interfering effect of a radar transmitter occupying a nominal frequency bandwidth into or on equipment working at an other operating band, where the other operating band is spaced from the nominal frequency bandwidth by a third frequency band. The method comprises the step of generating, at the radar transmitter, a constant-amplitude pulse centered at a frequency within the nominal frequency bandwidth of the radar. The constant-amplitude pulse has a nominal bandwidth which lies within the nominal frequency bandwidth, and which also has an actual bandwidth that extends into the other operating band. According to an aspect of the invention, phase perturbations are applied to the constant-amplitude pulse, so as to produce a phase-perturbed constant-amplitude pulse centered at the frequency within the nominal frequency bandwidth of the radar, with reduced amplitude of that portion of the actual bandwidth of the constant-amplitude pulse which lies within the other operating band. The phase-perturbed constant-amplitude pulse is transmitted toward a radar target.

A method, according to another aspect of the invention, is for reducing interference between constant-amplitude long-range and short-range radar subpulses, where the long-range radar subpulses are centered at a first frequency and have a first nominal passband, and the short-range pulses are centered at a second frequency, different from the first frequency and having a second nominal passband. The passband or actual spectrum of at least one of the long-range and short-range radar subpulses extends at least partially into the nominal passband of the other of the long-range and short-range radar subpulses. The method comprises the step of selectively applying phase perturbations to the one of the long-range and short-range radar subpulses, to tend to null that portion of the passband (or actual spectrum) of the one of the long-range and short-range radar subpulses which extends into the nominal passband of the other one of the long-range and short-range radar subpulses.

In a particular mode of the method according to this other aspect of the invention, the step of selectively applying phase perturbations includes the steps of:

(a) Compute $s_k$, the nominal pulse's $k^{th}$ digital sample as:

$$s_k = \cos\left(2\pi\left(\frac{f_0}{f_s}\right)k + \theta_k\right) \quad (1)$$

where:

k is a sample index ranging between 1 and N, the total number of samples in the net pulse;

$f_0$ is the pulse's center frequency;

$f_s$ is the rate at which the signal samples are read; and $\theta_k$ is the pulse's nominal phase modulation function;

(b) perturb $s_k$ with a phase perturbation function computed as $\Phi_k$ by $$\phi = \lambda[\lambda DRD + I]^{-1} DRs \qquad (2)$$

where:

ϕ is an N×1 column vector of phase perturbation samples with $k^{th}$ element equal to $\phi_k$;

λ is a positive scalar, greater than unity, whose value determines null depth;

D is an N×N diagonal matrix (all off-diagonal elements are zero) whose $k^{th}$ diagonal element is similar to $s_k$ with the cosine function replaced by the sine;

R is an N×N matrix that determines null center frequency, width, and shape;

I is an N×N identity matrix; and s is an N×1 vector whose $k^{th}$ element is equal to $s_k$, to thereby define a $k^{th}$ signal sample as $$\tilde{s}_k = \cos\left(2\pi\left(\frac{f_0}{f_s}\right)k + \theta_k + \phi_k\right) \qquad (3)$$

where the tilde indicates a sample of the phase-perturbed pulse and $\phi_k$ is the $k^{th}$ sample of the phase perturbation that creates the desired spectral null.

BRIEF DESCRIPTION OF THE DRAWINGS

FIGS. 2a and 2b illustrate plots of the spectrum of a linear frequency modulation pulse at a particular location in the arrangement of FIG. 1 without and with a spectral phase null, respectively, according to an aspect of the invention, while

DESCRIPTION OF THE INVENTION

Figure 1A:
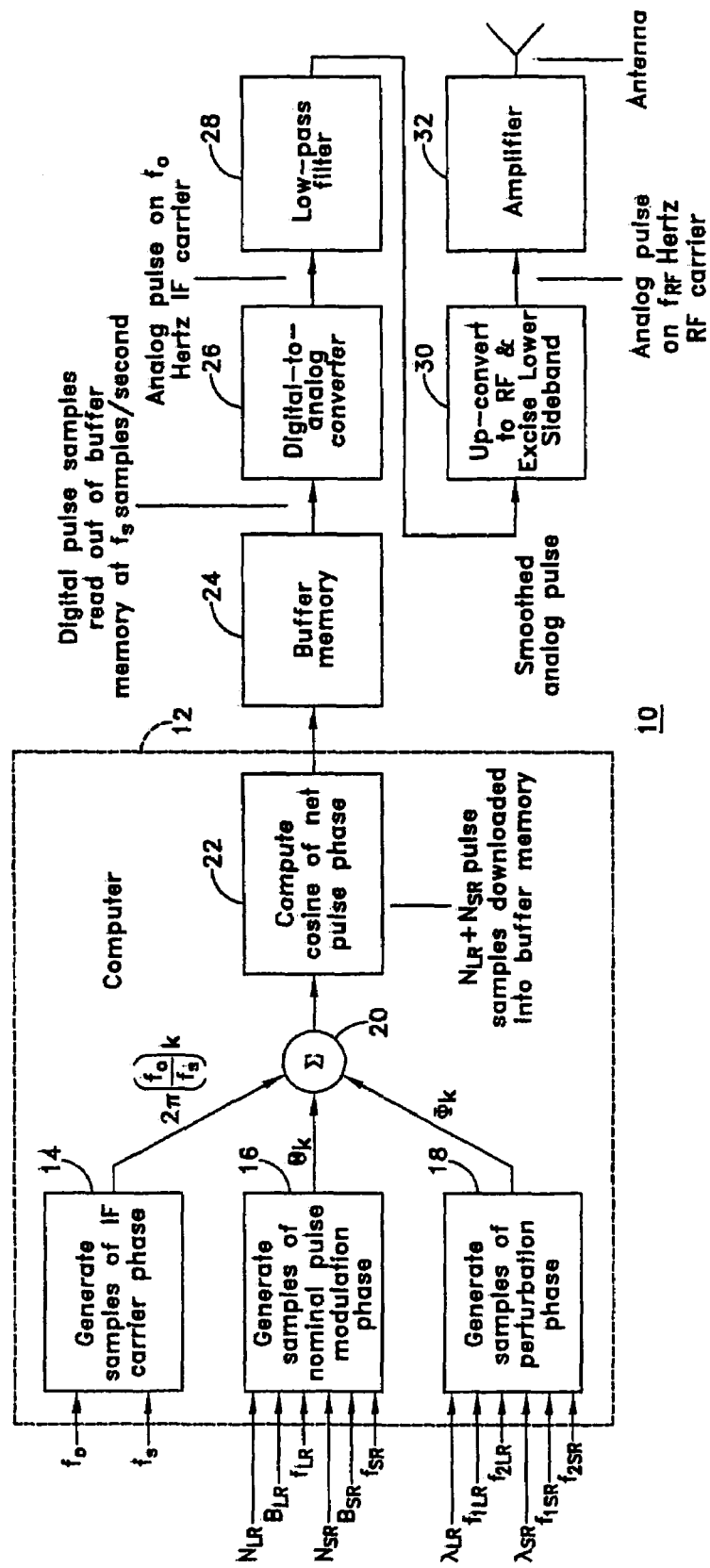
FIG. 1a is a simplified block diagram of a portion of a prior-art radar transmitter driven by a generalized digital waveform generator.

In FIG. 1a, a portion 10 of a radar transmitter uses a computer 12 including a portion 14 to generate digital phase samples at a sample rate $f_s$ of constant-amplitude pulse with arbitrary intermediate frequency (IF) carrier frequency $f_0$. The output signal of block 14 may be represented as $2\pi(f_0/f_s)k$, where k is the sample index, $0 \leq k \leq (N_{LR}+N_{SR}-1)$. A portion 16 of computer 12 produces a nominal but arbitrary phase modulation function Θ from input information including $N_{LR}$, $N_{SR}$, the number of samples in the long- and short-range subpulses, respectively; $B_{LR}$, $B_{SR}$, the bandwidths of the long- and short-range pulses, respectively; and $f_{LR}$, $f_{SR}$, the center frequencies of the long- and short-range subpulses, respectively. The output signal of block 16 is designated Θk. Furthermore, computer 12 includes a generator 18 for a phase perturbation function ∅ to exert fine control over the spectral response of the pulse, based on input information $\lambda_{LR}$, $\lambda_{SR}$, the null depth parameters for the long- and short-range subpulses; $f_{1LR}$, $f_{1SR}$, the low-frequency edges of the long- and short-range subpulses, respectively; and $f_{2LR}$, $f_{2SR}$, the high-frequency edges of the long- and short-range subpulses, respectively. The output signal of block 18 is designated Φk. The nominal phase function produced by block 16 subdivides the pulse into a high energy long-range subpulse used to detect targets at long range and a low-energy short-range subpulse used to detect targets at short range. In one embodiment, the long-range subpulse has a time duration of 110 microseconds (μS) and the short-range subpulse has a duration of 10 microseconds. The long- and short-range subpulses may have independent phase modulations and phase perturbations. The computer generated digital samples making up the long- and short-range subpulses are summed together in a summing (Σ) arrangement 20. More particularly, three different phase vectors are computed. In each case, the first $N_{LR}$ elements of the vector correspond to the long-range pulse and the last $N_{SR}$ elements correspond to the short-range pulse. These phase vectors are added element by element, following which the cosine of each element of the net phase sum vector is computed. The elements of the resulting vector are the digital samples of the waveform.

The summed digital samples making up the long- and and short-range subpulses are applied from summing arrangement 20 of FIG. 1a to a block 22, which computes the cosine of the net phase of the pulse. This cosine information is loaded into a buffer memory 24, and read serially at the design sample rate $f_s$ samples-per-second to a digital-to-analog converter (DAC) 26. The output of DAC block 26 is an analog pulse having a spectral response centered at an IF carrier frequency of $f_0$ Hz, which is applied to a low-pass filter 28 to remove distortions caused by the digital-to-analog conversion. The low-pass or smoothed filtered output from filter block 28 is applied to a block 30. Block 30 represents an up-converter for converting the analog pulse to a radio frequency (RF). Those skilled in the art know that "radio frequency" in the early days of radio had a meaning much different from that which it now bears. The current meaning of "RF" includes most electromagnetic radiation having wavelengths greater than those of light. In the context of radar, commonly used frequencies range from about 300 MHz to about 40 GHz, but may be at frequencies without this range. The upconversion performed in block 30 may be performed in plural stages, and may also include the excision or removal of one of the sidebands, such as the lower sideband, of the signal spectrum at any stage of the upconversion. The upconverted, and possibly single sideband, signal from block 30 of FIG. 1a is applied to an amplifier illustrated as a block 32 for raising the power level of the signal to be transmitted, and the pulse signal so amplified is transmitted by way of an antenna 34.

Figure 1B:
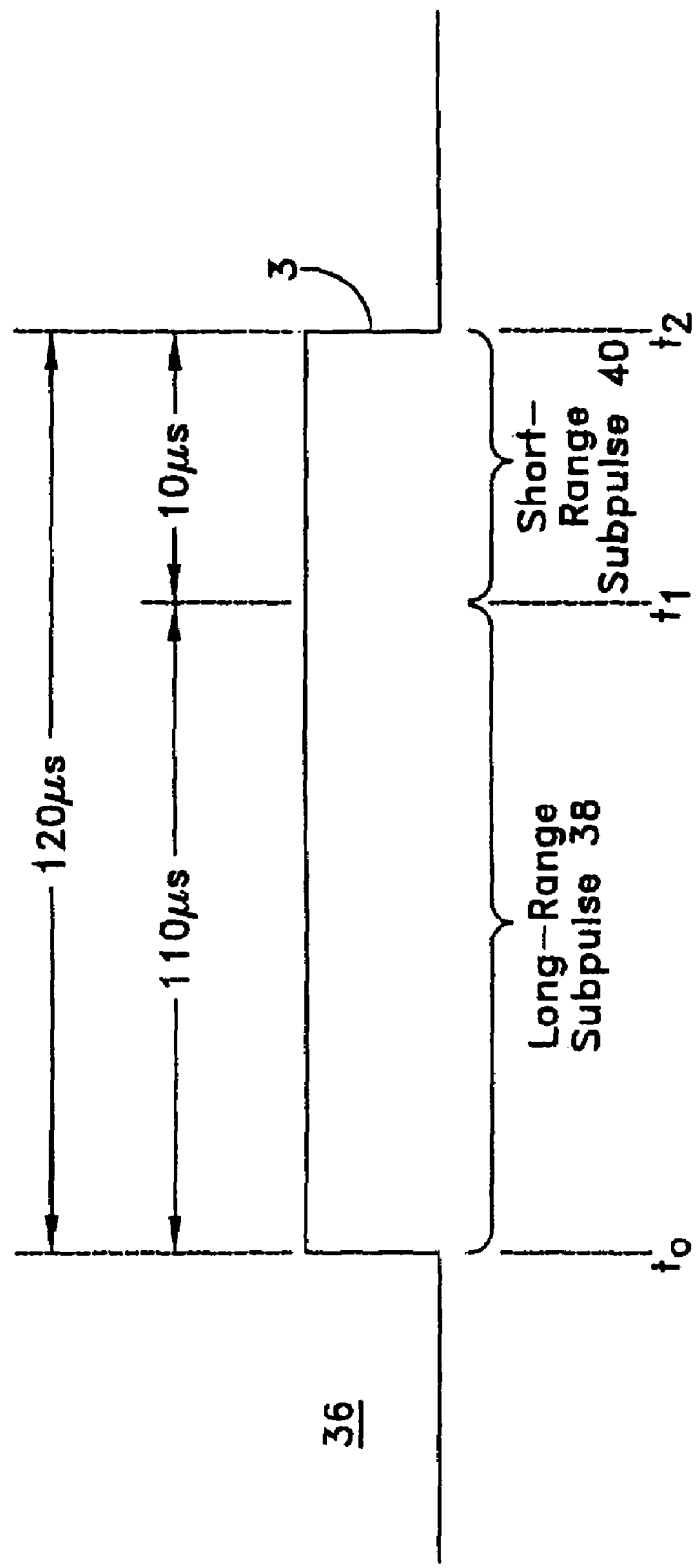
FIG. 1b is an amplitude-time diagram of concatenated subpulses of a radar pulse intended for dual short-range and long-range operation.

The amplified pulse waveform 34 produced at the output of filter block 28 of FIG. 1a is illustrated as 36 in FIG. 1b. In FIG. 1b, pulse 36 includes a long-range subpulse 38 that begins at a time illustrated as $t_0$, and extends to a time illustrated as t1. During the 110 μS interval from to to $t_1$, the frequency of the long-range subpulse 38 increases linearly from 1 MHz to 2 MHz, which value is centered on 1.5 MHz and is selected so that the waveform has a nominal 3 dB bandwidth of 1 MHz. Pulse 36 also includes a short-range subpulse 40 that extends from time $t_1$ to time $t_2$ of FIG. 1b is also linearly frequency modulated to produce a 1 MHz bandwidth centered about 3.5 MHz.

Figure 1C:
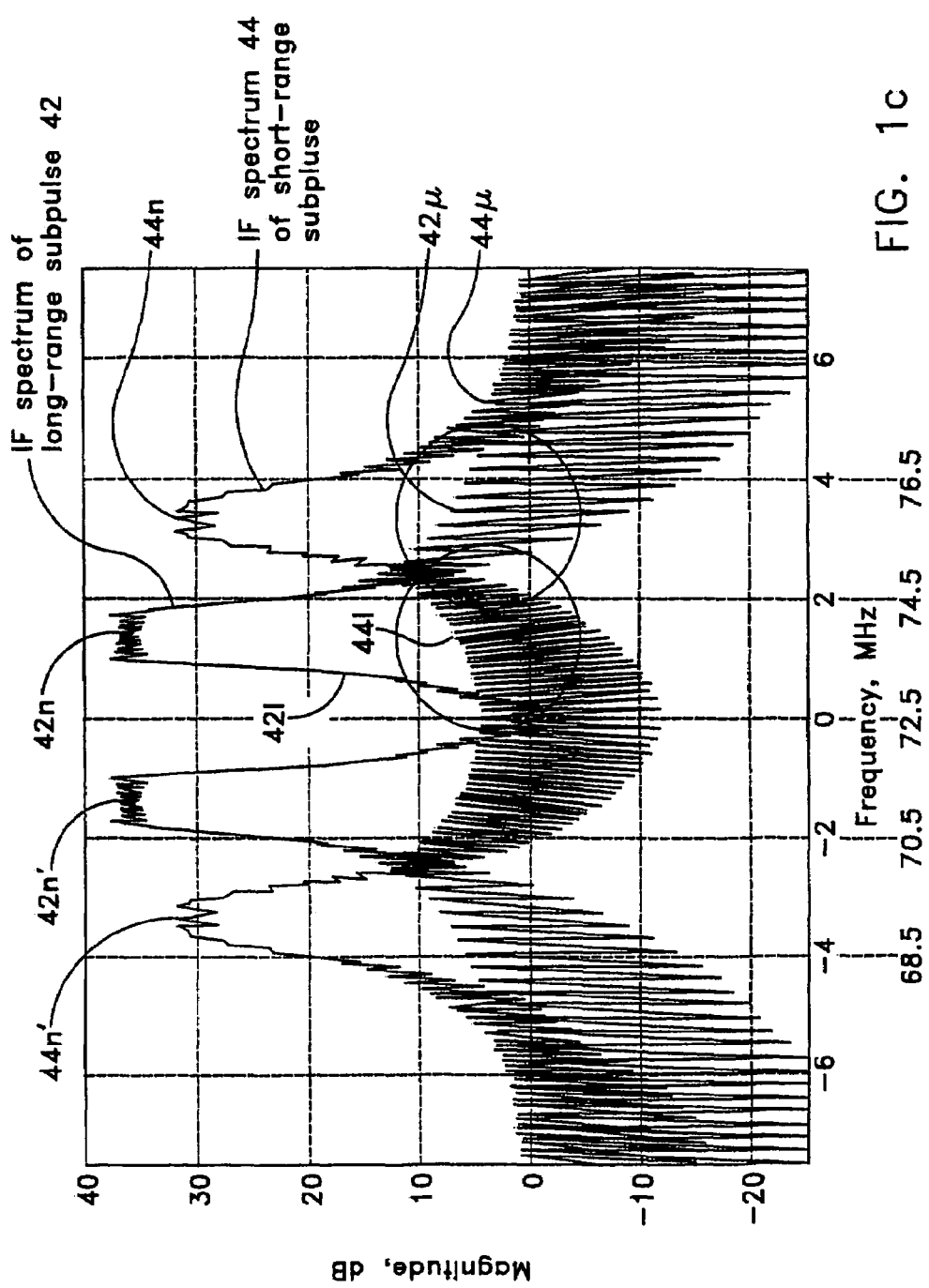
FIG. 1c is an amplitude spectrum of the subpulses of the radar pulse of FIG. 1b.

FIG. 1c is a plot at IF frequencies of the calculated amplitude spectrum of the 110 μS long-range subpulse 38 of FIG. 1b. It should be noted that to simplify the computation of the illustrated spectrum, the actual duration of the waveform for which the computation was performed was 40 μS; the appearance of a 110 μS subpulse is similar. The waveform of FIG. 1c represents the signal spectrum of the waveform at the output of filter 28 (the input to the upconverter 30) of FIG. 1a, and shows two distinct spectral peaks, namely 42n and 44n, at positive frequencies and two additional "image" spectral peaks 42n' and 44n' occurring at negative (−) frequencies. If examined by a spectrum analyzer, the analyzer screen will show only the positive (+) portion of the spectrum. But after the signal is modulated up to a second intermediate frequency (IF), such as 72.5 MHz, four lobes appear, namely the four lobes 42n, 42n', and 44n' shown in FIG. 1c. More particularly, lobe 44n' centered at −3.5 MHz will, after upconversion, shift to 72.5−3.5 or 69.0 MHz, lobe 42n' centered at −1.5 MHz will shift to 72.5−1.5 or 71.0 MHz, lobe 43n centered at +1.5 MHz will shift to 72.5+1.5 or 74.0 MHz, and lobe 44n' centered at +3.5 MHz will shift to 72.5+3.5 or 76.0 MHz. Notice that lobes 42n and 44n (those centered at positive frequencies) occupy a 3 MHz band centered on 75 MHz, which is a typical radar IF frequency. It is only necessary to add 72.5 MHz to the horizontal axis of FIG. 1c, as indicated by the "upconverted" frequency scale, to see what the upconverted signal spectrum looks like.

In order to allow transmission of only the two lobes illustrated as being centered at positive frequencies in FIG. 1c, the upconverted signal from upconverter 30 of FIG. 1a is passed through a 3-MHz-wide bandpass filter centered at 75 MHz. Such a filter can be implemented as a surface acoustic wave (SAW) filter. The output of the bandpass filter is then the lobe pair 42n, 44n centered on 75 MHz, and lacks the lobes 42n', 44n'.

In FIG. 1c, the amplitude spectrum at IF of the long-range subpulse 32 of FIG. 1b is designated 42, and the amplitude spectrum at IF of the short-range subpulse 34 of FIG. 1b is designated 44. The 3 dB bandwidth or nominal bandwidth of both positive-frequency spectral peaks 42, 44 is about 1 MHz. The "nominal" bandwidth may be viewed as being that frequency range within which the spectral pulse has a "flat" top. The spectral peak associated with long-range subpulse spectrum 42 extends from about 1 MHz to about 2 MHz, and the spectral peak associated with short-range subpulse spectrum 44 extends from about 3 MHz to about 4 MHz. As illustrated, the total spectral content of each of the two subpulses 42, 44 extends beyond the nominal 3 dB bandwidth in what is known as sidebands or "skirts". The sideband region of the long-range subpulse spectrum 42 includes a lower sideband region 42e which extends from about 0 MHz to about 1 MHz. It is of no interest for purposes of the invention. The sideband region of long-range subpulse spectrum 42 also includes an upper skirt 42u, extending above about 2 MHz, with generally decreasing peak amplitude. The sidebands of short-range subpulse spectrum 44 include an upper skirt 44u extending above about 4 MHz with decreasing peak amplitude. The upper skirt 44u of the sidebands of short-range subpulse 44 is not of interest. The sidebands of short-range subpulse spectrum 44 also include a lower skirt 44l, which extends from about 0 MHz to about 3 MHz, with peak amplitude which increases with frequency.

At those frequencies at which the short-range subpulse 34 has its nominal or maximum energy, namely in the range of 3 to 4 MHz of FIG. 1c, there is a substantial amount of upper sideband energy attributable to the long-range subpulse 32. In the middle of the nominal spectrum or bandwidth 44 of the short-range subpulse 34, namely at about 3½ MHz, the peak level of long-range subpulse 32 sideband energy 42u (in the region of the circle designated A in FIG. 1c) is about 24 dB down, or −24 dB, relative to the peak spectral energy 44 of the short-range subpulse 34.

Ideally, the transmitted spectral energy used to detect long-range targets would be limited to the nominal bandwidth, which in the example illustrated in FIG. 1c is the range of 1 to 2 MHz, and the transmitted spectral energy used to detect short-range targets would be limited to the nominal bandwidth, which in FIG. 1c is the range of 3 to 4 MHz. However, the upper sidebands 42u of the spectrum 42 of the long-range subpulse 32 extend into the nominal bandwidth of the spectrum 44 of short-range subpulse 34. Thus, energy in the frequency range of interest for short-range targets, namely in the frequency range of 3 to 4 MHz, is being transmitted in the upper sidebands or skirts of the spectrum 42 of the long-range subpulse 32. Similarly, the lower sideband or skirt of the spectrum 44 of the short-range subpulse 34 contains energy in the range of 1 to 2 MHz that is about 30 dB below the peak energy of the long-range pulse (the circle designated B in FIG. 1c).

The sideband energy produced outside the nominal bandwidth of the long-range and short-range pulses may be viewed as being pure interference. The energy transmitted by the long-range subpulse in the nominal bandwidth of short-range subpulse 34 interferes with the desired short-range target signal, and reduces the signal-to-noise ratio of the desired target signals. Additionally, the long-range subpulse energy falling within the passband of the short-range subpulse can cause the long-range target to be incorrectly detected in the short-range processing channel, where it will be interpreted as a short-range target. This same target would also be correctly detected in the long-range channel at its true range. Thus, the leakage of long-range energy into the short-range passband may result in a single target being detected simultaneously at two different ranges. Similarly, the energy transmitted by the short-range subpulse 32 in the nominal bandwidth of long-range subpulse 34 interferes with the desired long-range target signal, and reduces the signal-to-noise ratio of the desired target signals. Leakage of short-range energy into the long-range subpulse passband also causes interference, and in some cases could cause two simultaneous detections of the same target. However, leakage of the short-range energy into the long-range passband is not nearly as serious as the leakage of long-range energy into the short-range passband, because of the large energy differential between the two subpulses.

As mentioned, the peak power of a radar signal may be relatively large, and the "buffer" frequency separation between the nominal bandwidth of a radar signal and the frequency range used for some other purpose may be relatively small. Looking on the spectra of FIG. 1c as being representative of a radar transmitter with a nominal bandwidth in the frequency range of 1 to 2 MHz in the presence of another user of spectrum in the frequency range of 3 to 4 MHz, it is clear from the level of skirt energy in circle A that there will be substantial energy in the operating frequency band of that other user.

The procedure for forming a spectral phase null by perturbing a pulse's digital samples prior to upconversion in block 30 of FIG. 1a, given N digital samples of a nominal constant-amplitude radar pulse prior to conversion from digital to analog-IF (intermediate frequency) form and subsequent up-conversion to RF (radio frequency), an arbitrary spectral phase null is formed by the following steps.

Compute $s_k$, the nominal pulse's $k^{th}$ digital sample as:

$$s_k = \cos\left(2\pi\left(\frac{f_0}{f_s}\right)k + \theta_k\right) \quad (4)$$

where:
  k is a sample index ranging between 1 and N, the total number of samples in the net pulse;
  $f_0$ is the pulse's center frequency at the input to the digital-to-analog (D/A) converter;
  $f_s$ is the sample rate at which the signal samples are to be read out of a digital memory (and the same rate at which the D/A converter operates); and
  $\theta_k$ is the pulse's nominal phase modulation function.

Perturb $s_k$ with a phase perturbation function, $\phi_k$, that creates a spectral phase null of the desired width, depth, shape, and center frequency. The resulting $k^{th}$ signal sample can be expressed as:

$$\tilde{s}_k = \cos\left(2\pi\left(\frac{f_0}{f_s}\right)k + \theta_k + \phi_k\right) \quad (5)$$

where
  the tilde (~) indicates a sample of the phase-perturbed pulse; and
  $\phi_k$ is the $k^{th}$ sample of the phase perturbation that creates the desired spectral null.

The phase perturbation of Equation 2 is computed as:

$$\phi = \lambda[\lambda DRD + I]^{-1}DRs \quad (6)$$

where:
  $\phi$ is an N×1 column vector of phase perturbation samples with $k^{th}$ element equal to $\phi_k$;
  $\lambda$ is a positive scalar, greater than unity, whose value determines null depth;
  D is an N×N diagonal matrix (all off-diagonal elements are zero) whose $k^{th}$ diagonal element is similar to $s_k$ with the cosine function replaced by the sine;
  R is an N×N matrix that determines null center frequency, width, and shape;
  I is an N×N identity matrix; and
  s is an N×1 vector whose $k^{th}$ element is equal to $s_k$.

As noted, the matrix D has the form:

$$D = \begin{bmatrix} d_1 & 0 & 0 & 0 & 0 \\ 0 & d_2 & 0 & 0 & 0 \\ 0 & 0 & d_3 & 0 & 0 \\ 0 & 0 & 0 & \ddots & 0 \\ 0 & 0 & 0 & 0 & d_N \end{bmatrix} \quad (7)$$

and $d_k$, its $k^{th}$ diagonal element, is given by:

$$d_k = \sin\left(2\pi\left(\frac{f_0}{f_s}\right)k + \theta_k\right) \quad (8)$$

Proper selection of the elements of matrix R enables the spectral phase null to be arbitrarily positioned and shaped. For example, an R matrix with $mn^{th}$ element given by:

$$R_{mn} = 2\operatorname{sinc}\left(\frac{(m-n)(f_2 - f_1)}{f_s}\right)\cos\left(\frac{(m-n)\pi(f_2 + f_1)}{f_s}\right) \quad (9)$$

will form an approximately constant-depth, rectangular phase null extending from frequency $f_1$ to frequency $f_2$ and centered on the mean of $f_1$ and $f_2$. In Equation 6:
  integer m is the matrix row index, ranging from 1 to N;
  integer n is the matrix column index, ranging from 1 to N; and
  $f_s$ is the sample rate.
Furthermore, the function sinc(x) is defined as:

$$\operatorname{sinc}(x) = \frac{\sin(\pi x)}{\pi x} \quad (10)$$

The phase perturbation of Equation 3 is derived by linearizing a nonlinear trigonometric equation and is therefore an approximation, but a very good approximation, as long as the specified null parameters can be satisfied with small values of $\phi_k$. Accuracy can be improved substantially by iterating. In this case, the outlined nulling procedure is executed and a phase perturbation vector is obtained. Denoting this phase perturbation vector as $\phi_A$, the pulse's nominal phase modulation vector, $\theta$, is perturbed to form a new phase modulation $\theta + \phi_A$. Normally, the nulling procedure ends at this point. However, the perturbed phase modulation function, $\theta + \phi_A$, can be interpreted as a new nominal phase modulation and the process repeated with $\theta + \phi_A$ replacing $\theta$. An arbitrary number of iterations can then be chained, each using the perturbed phase modulation function from the previous step as the nominal phase modulation function for the next step. Nulls requiring net phase perturbations larger than would normally be allowed by the trigonometric linearization can then be easily accommodated.

Ideally, a closed-form expression would relate the depth parameter, $\lambda$, to null depth. Unfortunately, a closed form solution does not exist and $\lambda$ must be determined empirically, i.e., by trial and error. Typically, two or three trials are sufficient to set its value.

Figure 2A:
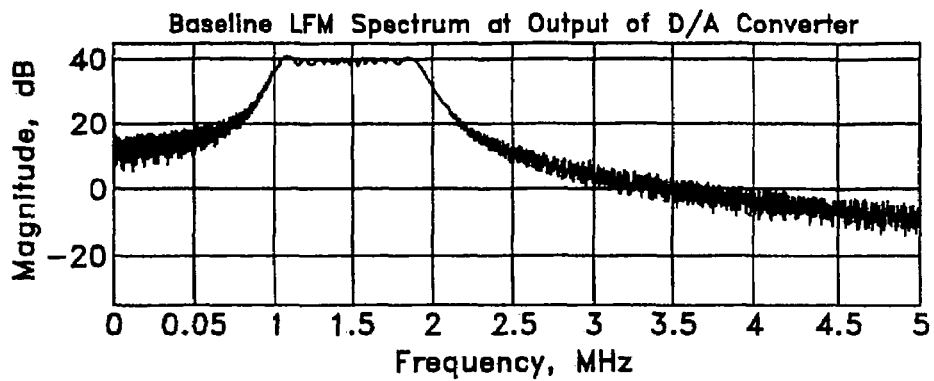
Figure 2B:
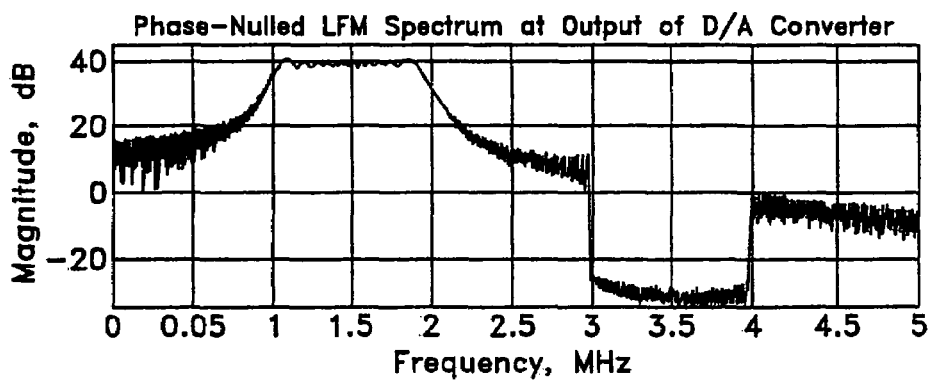
Figure 2C:
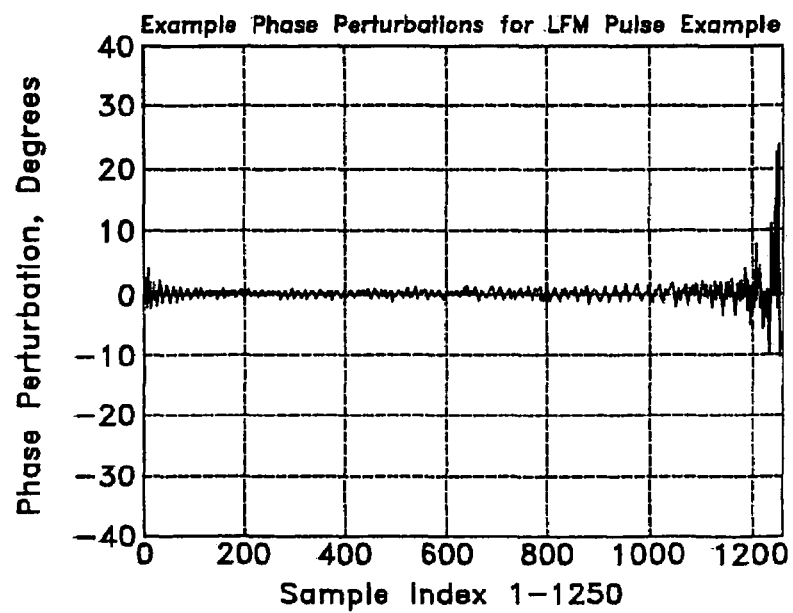
FIG. 2c shows the set of 1250 phase perturbations that created the exemplary null of FIG. 2b.

FIGS. 2a, 2b, and 2c illustrate the formation of a broad spectral phase null in the sidelobes of a 1 MHz bandwidth, 50 microsecond, linear frequency modulation (LFM) pulse centered on a 1.5 MHz IF carrier, using the above equations. The first two plots, namely the plots of FIGS. 2a and 2b, illustrate the positive frequency half of the LFM spectrum without and with the spectral phase null, respectively, while the third plot, namely the plot of FIG. 2c, shows the set of 1250 phase perturbations that created the example null. Note that most of the phase perturbations are on the order of one degree, with larger values occurring only near the pulse edges. Corresponding parameters for the example are:
  $f_0$=1.5 MHz;
  $f_1$=3.0 MHz;
  $f_4$=4.0 MHz;
  $f_s$=25.0 MHz
  N=1250
  $\Theta_K = \pi B(2k-N-1)^2/4f_s^2 T$;
  B=1.0 Hz;
  T=50 μS;
  $\lambda$=25;
  iterations=4.

Figure 3:
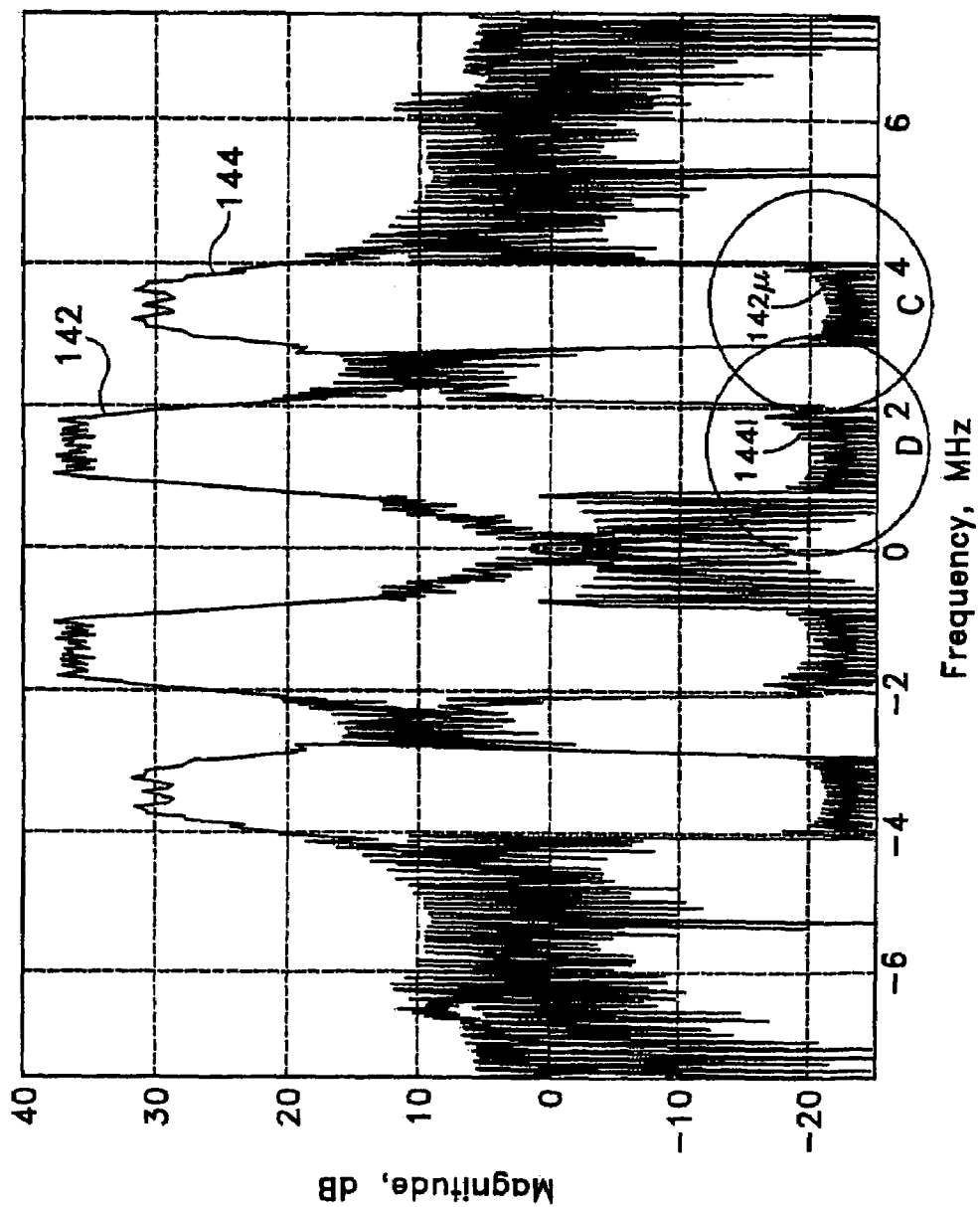
FIG. 3 is a spectrum illustrating the juxtaposition of long- and short-range pulses with nulled spectra in each other's passbands.

FIG. 3 illustrates the spectral content of long-range and short-range radar subpulses similar to the illustration of FIG. 1c, showing how the use of the invention reduces the undesired sideband energy extending into the nominal bandwidth of an adjacent band. In FIG. 3, the spectrum of the long-range subpulse 32 (of FIG. 1b) is designated 142, and the spectrum of the short-range subpulse 34 is designated 144. As illustrated within a circle designated C, that portion of the upper sideband 142u of the long-range subpulse 32 falling within the nominal spectral bandwidth 144 of short-range subpulse 34 is reduced by nulling, in accordance with the invention, to a level which is about 50 dB below the peak spectral level within the nominal 3-to-4 MHz bandwidth of short-range subpulse 34. Similarly, that portion of the lower sideband 144l of the short-range subpulse 34 (illustrated within a circle designated D) falling within the nominal spectral bandwidth 142 of long-range subpulse 32 is reduced by nulling in accordance with the invention to a level which is about 55 dB below the peak spectral level within the nominal 1-to-2 MHz bandwidth of long-range subpulse 32.

Those skilled in the art will recognize that the principles of the invention may be applied to a transmitted electromagnetic pulse that lies in a region where one or more distinct operating sub-bands must be kept free for uses other than radar. While the illustrated nulling is in the range of 50 to 55 dB, the amount of nulling will depend upon the degree with which the phase can be controlled, and may be a greater or lesser amount.

Thus, a method according to an aspect of the invention is for reducing the interfering effect of a radar transmitter occupying a nominal frequency bandwidth into or on equipment working at an other operating band, where the other operating band is spaced from the nominal frequency bandwidth by a third frequency band. The method comprises the step of generating, at the radar transmitter (10), a constant-amplitude pulse (30) centered at a frequency (1.5 MHz for the long-range pulse) within the nominal frequency bandwidth (1 to 2 MHz for the long-range pulse) of the radar (10). The constant-amplitude pulse (30) has a nominal bandwidth (4.2n) which lies within the nominal frequency bandwidth, and which also has an actual bandwidth (42P, 42u) which extends into the other operating band (44n). According to an aspect of the invention, phase perturbations are applied to the constant-amplitude pulse, so as to produce a phase-perturbed constant-amplitude pulse centered at the frequency within the nominal frequency bandwidth of the radar, with reduced amplitude of that portion of the actual bandwidth of the constant-amplitude pulse which lies within the other operating band. The phase-perturbed constant-amplitude pulse is transmitted toward a radar target.

A method, according to another aspect of the invention, is for reducing interference between constant-amplitude long-range (42) and short-range (44) radar subpulses, where the long-range radar subpulses (42) are centered at a first frequency (1.5 MHz for long-range subpulses) and have a first nominal passband (42n), and the short-range pulses (34) are centered at a second frequency (3.5 MHz for short-range subpulses), different from the first frequency (1.5 MHz) and having a second nominal passband (44n). The passband or actual spectrum (42: 42n, 42P, 42u or 44: 44n, 44P, 44u) of at least one of the long-range (32) and short-range (34) radar subpulses extends at least partially into the nominal passband (44n or 42n) of the other of the long-range (32) and short-range (34) radar subpulses. The method comprises the step of selectively applying phase perturbations to the one of the long-range and short-range radar subpulses, to tend to null that portion of the passband (or actual spectrum) of the one of the long-range and short-range radar subpulses which extends into the nominal passband of the other one of the long-range and short-range radar subpulses.

In a particular mode of the method according to this other aspect of the invention, the step of selectively applying phase perturbations includes the steps of:

Compute $s_k$, the nominal pulse's $k^{th}$ digital sample as:

$$s_k = \cos\left(2\pi\left(\frac{f_0}{f_s}\right)k + \theta_k\right) \quad (11)$$

where:

k is a sample index ranging between 1 and N, the total number of samples in the net pulse;

$f_0$ is the pulse's center frequency at the input to the digital-to-analog (D/A) converter;

$f_s$ is the sample rate at which the signal samples are (or are to be) read out of a digital memory, corresponding in the example to the rate at which the DAC operates; and $\theta_k$ is the pulse's nominal phase modulation function;

(b) perturb $s_k$ with a phase perturbation function computed as $\Phi_k$ $$\phi = \lambda[\lambda DRD + I]^{-1}DRs \quad (12)$$

where:

$\phi$ is an N×1 column vector of phase perturbation samples with $k^{th}$ element equal to $\phi k$;

$\lambda$ is a positive scalar, greater than unity, whose value determines null depth;

D is an N×N diagonal matrix (all off-diagonal elements are zero) whose $k^{th}$ diagonal element is similar to $s_k$ with the cosine function replaced by the sine;

R is an N×N matrix that determines null center frequency, width, and shape;

I is an N×N identity matrix; and s is an N×1 vector whose $k^{th}$ element is equal to $s_k$, to thereby define a $k^{th}$ signal sample as $$\tilde{s}_k = \cos\left(2\pi\left(\frac{f_0}{f_s}\right)k + \theta_k + \phi_k\right) \quad (13)$$

where the tilde indicates a sample of the phase-perturbed pulse and $\phi_k$ is the $k^{th}$ sample of the phase perturbation that creates the desired spectral null.

What is claimed is:

1. A method for reducing the interfering effect of a radar transmitter occupying a nominal frequency bandwidth into an other operating band, where said other operating band is spaced from said nominal frequency bandwidth by a third frequency band, said method comprising the steps of:

generating at said radar transmitter a constant-amplitude pulse centered at a frequency within said nominal frequency bandwidth of said radar and having a nominal bandwidth which lies within said nominal frequency bandwidth, and which also has an actual bandwidth which extends into said other operating band;

applying phase perturbations to said constant-amplitude pulse so as to produce a phase-perturbed constant-amplitude pulse centered at said frequency within said nominal frequency bandwidth of said radar with reduced amplitude of that portion of said actual bandwidth of said constant-amplitude pulse which lies within said other operating band; and transmitting said phase-perturbed constant-amplitude pulse toward a radar target.

2. A method for reducing interference between constant-amplitude long-range and short-range radar subpulses, where said long-range radar subpulses are centered at a first frequency and have a first nominal passband and said short-range pulses are centered at a second frequency, different from said first frequency and having a second nominal passband, the passband of at least one of said long-range and short-range radar subpulses extending at least partially into said nominal passband of the other of said long-range and short-range radar subpulses, said method comprising the steps of:

selectively applying phase perturbations to said one of said long-range and short-range radar subpulses to tend to null that portion of said passband of said one of said long-range and short-range radar subpulses which extends into said nominal passband of said other one of said long-range and short-range radar subpulses; and transmitting at least one of the phased perturbed subpulses toward a radar target.

3. A method according to claim 2, wherein said step of selectively applying phase perturbations includes the steps of:

(a) Compute $s_k$, the nominal pulse's $k^{th}$ digital sample as:

$$s_k = \cos\left(2\pi\left(\frac{f_0}{f_s}\right)k + \theta_k\right)$$

where:
- k is a sample index ranging between 1 and N, the total number of samples in the net pulse;
- $f_0$ is the pulse's center frequency at the input to the digital-to-analog (D/A) converter;
- $f_s$ is the sample rate at which the signal samples are to be read out of a digital memory (and the same rate at which the D/A converter operates); and
- $\theta_k$ is the pulse's nominal phase modulation function;

(b) compute the phase perturbation as:

$$\phi = \lambda[\lambda DRD + I]^{-1} DRs$$

where:
- $\phi$ is an N×1 column vector of phase perturbation samples with $k^{th}$ element equal to $\phi_k$;
- $\lambda$ is a positive scalar, greater than unity, whose value determines null depth;
- D is an N×N diagonal matrix (all off-diagonal elements are zero) whose $k^{th}$ diagonal element is similar to $s_k$ with the cosine function replaced by the sine;
- R is an N×N matrix that determines null center frequency, width, and shape;
- I is an N×N identity matrix; and
- s is an N×1 vector whose $k^{th}$ element is equal to $s_k$, to thereby define a $k^{th}$ signal sample as $$\tilde{s}_k = \cos\left(2\pi\left(\frac{f_0}{f_s}\right)k + \theta_k + \phi_k\right)$$

where the tilde indicates a sample of the phase-perturbed pulse and $\phi_k$ is the $k^{th}$ sample of the phase perturbation that creates the desired spectral null.

\* \* \* \* \*